United States Patent
Meng (10) Patent No.: US 10,409,098 B2
(45) Date of Patent: Sep. 10, 2019

(54) DISPLAY APPARATUS AND ELECTRICAL DEVICE

(71) Applicant: Shenzhen China Star Optoelectronics Technology Co., Ltd., Shenzhen, Guangdong (CN)

(72) Inventor: Xiaolong Meng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 233 days.

(21) Appl. No.: 14/891,653

(22) PCT Filed: Aug. 4, 2015

(86) PCT No.: PCT/CN2015/086015
§ 371 (c)(1),
(2) Date: Nov. 16, 2015

(87) PCT Pub. No.: WO2017/015978
PCT Pub. Date: Feb. 2, 2017

(65) Prior Publication Data
US 2017/0168335 A1 Jun. 15, 2017

(30) Foreign Application Priority Data
Jul. 28, 2015 (CN) .......................... 2015 1 0450467

(51) Int. Cl.
*G02F 1/1333* (2006.01)
*G02F 1/1343* (2006.01)
*G02F 1/1335* (2006.01)

(52) U.S. Cl.
CPC .... *G02F 1/13336* (2013.01); *G02F 1/133504* (2013.01); *G02F 1/133526* (2013.01);
(Continued)

(58) Field of Classification Search
CPC .......... G02F 1/13336; G02F 1/134309; G02F 1/133526; G02F 1/133504;
(Continued)

(56) References Cited

U.S. PATENT DOCUMENTS 6,128,054 A * 10/2000 Schwarzenberger ........................
G02F 1/13336
348/E5.144
6,483,482 B1 * 11/2002 Kim .................... G02F 1/13336
345/1.1

(Continued)

FOREIGN PATENT DOCUMENTS

CN          2121777 U     11/1992
CN        102184678 A      9/2011
(Continued)

*Primary Examiner* — Paisley L Arendt
*Assistant Examiner* — Mariam Qureshi
(74) *Attorney, Agent, or Firm* — Andrew C. Cheng (57) ABSTRACT

The application discloses a display apparatus and an electrical device. The display apparatus including at least a display panel, the display panel having a display zone, and a frame zone in the outer of the display zone; at least a concave lens, the concave lens is set in the boundary of the display zone to diffuse partial of the light emerged from the display zone to the frame zone side; and at least a convex lens, the convex lens crossing the boundary of the display zone and the frame zone, and the other boundary is flush with the boundary of the frame zone and emerge parallel light diffused from the concave lens. When the display apparatus is used in the splice electrical device, the two display apparatus can achieve the seamless splicing display.

17 Claims, 4 Drawing Sheets

(52) U.S. Cl.
CPC ............. *G02F 1/134309* (2013.01); *G02F 2001/133331* (2013.01); *G02F 2001/133388* (2013.01); *G02F 2001/133391* (2013.01)

(58) Field of Classification Search
CPC .......... G02F 2001/13331; G02F 2001/133391; G02F 2001/133388; G02B 3/00–14
See application file for complete search history.

(56) References Cited

U.S. PATENT DOCUMENTS

| | | | | |
|---|---|---|---|---|
| 2006/0114374 | A1* | 6/2006 | Segawa | G02F 1/133526 349/95 |
| 2014/0177062 | A1 | 6/2014 | Lee et al. | |
| 2016/0204317 | A1* | 7/2016 | Li | F21V 13/14 362/293 |
| 2016/0245961 | A1* | 8/2016 | Akasaka | G02B 3/0068 |

FOREIGN PATENT DOCUMENTS

| | | |
|---|---|---|
| CN | 203150019 U | 8/2013 |
| CN | 104076506 A | 10/2014 |
| KR | 101033462 B1 | 5/2011 |

\* cited by examiner

DISPLAY APPARATUS AND ELECTRICAL DEVICE

FIELD OF THE INVENTION

The present invention relates to the field of display technology, and more particularly to a Display apparatus and electrical device

BACKGROUND OF THE INVENTION

In recent years, the application of the large size displays is more wildly. Currently, a large size display apparatus is mainly achieved by large size screen splice technology, for example, CRT Projected Display Wall, LCD Rear Projection Wall, DLP Rear Projection Video Wall, and plasma display wall. The large size screen splice technology is to splice a plurality of the display apparatus to a larger display apparatus. However, when using the splice technology, the seams of the plurality of the display apparatus had been seen.

A liquid crystal display apparatus is as an example to illustrated to question mentioned above. The liquid crystal display apparatus includes a liquid crystal display, a backlight source, and a circuit and power source to provide the electrical signal to the liquid crystal display, and the case to house the component. A couple of glass substrates are provided, a color filter layer and the electrodes are formed on one of the glass substrates, and the thin-film transistor, bus line, and the driving circuit to provide signals are formed on the other glass substrate. Besides, a plurality of the pixels is formed on the display zone and a frame zone corresponding to the display zone on the liquid crystal display. In the frame zone, a seal part is formed to face and contain the couple of the glass substrates and seal the liquid crystal, and a circuit part for the driving circuit to driving the pixels. Therefore, the pixels cannot form in the frame zone and not work for display.

Because the frame zone of the liquid crystal display is not work for display. When splicing a plurality of the liquid crystal display to a larger screen, there is no display in the frame of the liquid crystal display, and seams are formed in the display.

SUMMARY OF THE INVENTION

The invention for solving the technology problem is to provide a display apparatus to solve the seams in the splice large size display apparatus.

In order to solve the technology problem mentioned above, the technical approach of this application is providing a display apparatus including: at least a display panel, wherein the display panel having a display zone with a plurality of arranged pixels, and a frame zone in the outer of the display zone; at least a concave lens, the concave lens is set in the boundary of the display zone to diffuse partial of the light emerged from the display zone to the frame zone side; and at least a convex lens, one boundary of the convex lens is flush with inner side of the concave lens face to the display zone, the convex lens crossing the boundary of the display zone and the frame zone, and the other boundary is flush with the boundary of the frame zone and emerge parallel light diffused from the concave lens; the light pass through the concave lens and the convex lens to have a parallel emerging light in every part of the light emitting surface of the display apparatus; a translucent cover is further included in the display apparatus, the translucent cover covered on the display panel, and the concave lens and the convex lens are formed between the translucent cover and the display panel; the display zone further including a first display zone and a second display zone, wherein the plurality of the pixels of the first display zone is arranged evenly and the arrangement of the plurality of the pixels of the second display zone is getting closer form the boundary of the first display zone and the second display zone to the frame zone; wherein the pixels in the first display zone of the display apparatus is evenly displayed in the light emitting surface faced to the first display zone; the pixels in the second display zone are diffused by the concave lens, then straight by the convex lens, and evenly displayed on the light emitting surface faced to the second display zone and the frame zone.

Wherein the boundary of the concave lens is flush with the boundary of the display zone or over the display zone and extends to the frame zone.

Wherein the display apparatus further including a backlight source, the intensity of the light emitted by the backlight source to the second display zone is high than the intensity of the light emitted by the backlight source to the first display zone, and the intensity of the light emitted by the backlight source is evenly in the first display zone, and the intensity of the light emitted by the backlight source to the second display zone is higher and higher from the boundary with the first display zone to the frame zone.

In order to solve the technology problem mentioned above, the another technical approach of this application is providing a display apparatus including at least a display panel, wherein the display panel having a display zone with a plurality of arranged pixels, and a frame zone in the outer of the display zone; at least a concave lens, wherein the concave lens is set in the boundary of the display zone to diffuse partial of the light emerged from the display zone to the frame zone side; at least a convex lens, wherein one boundary of the convex lens is flush with inner side of the concave lens face to the display zone, the convex lens crossing the boundary of the display zone and the frame zone, and the other boundary is flush with the boundary of the frame zone and emerge parallel light diffused from the concave lens; and the light pass through the concave lens and the convex lens to have a parallel emerging light in every part of the light emitting surface of the display apparatus.

Wherein the concave lens is formed on the display panel or fixed on the display panel.

Wherein the boundary of the concave lens is flush with the boundary of the display panel or over the display panel and extends to the frame zone.

Wherein the display apparatus further including a translucent cover, the translucent cover covered the display panel and the concave lens and the convex lens are formed between the translucent cover and the display panel.

Wherein the convex lens is formed on the translucent cover or fixed on the translucent cover.

Wherein the display zone including a first display zone and a second display zone, wherein the plurality of the pixels of the first display zone is arranged evenly and the arrangement of the plurality of the pixels of the second display zone is getting closer form the boundary of the first display zone and the second display zone to the frame zone; wherein the pixels in the first display zone of the display apparatus is evenly displayed in the light emitting surface faced to the first display zone; the pixels in the second display zone are diffused by the concave lens, then straight by the convex lens, and evenly displayed on the light emitting surface faced to the second display zone and the frame zone.

Wherein the display zone including one first display zone and two second display zones, the two second display zone is formed on the bilateral of the first display zone and all of the outer sides of the second display zone are the frame zone.

Wherein the concave lens is overlap with the second display zone in the normal direction vertical to the display panel.

Wherein the display apparatus further including a backlight source, the intensity of the light emitted by the backlight source to the second display zone is high than the intensity of the light emitted by the backlight source to the first display zone, and the intensity of the light emitted by the backlight source is evenly in the first display zone, and the intensity of the light emitted by the backlight source to the second display zone is higher and higher from the boundary with the first display zone to the frame zone.

In order to solve the technology problem mentioned above, the another technical approach of this application is providing an electrical device, wherein the electrical device including two display zones, all of the two display zones are display apparatus including: at least a display panel, wherein the display panel having a display zone with a plurality of arranged pixels, and a frame zone in the outer of the display zone; at least a concave lens, wherein the concave lens is set in the boundary of the display zone to diffuse partial of the light emerged from the display zone to the frame zone side; at least a convex lens, wherein one boundary of the convex lens is flush with inner side of the concave lens face to the display zone, the convex lens crossing the boundary of the display zone and the frame zone, and the other boundary is flush with the boundary of the frame zone and emerge parallel light diffused from the concave lens; and the light pass through the concave lens and the convex lens to have a parallel emerging light in every part of the light emitting surface of the display apparatus and the boundaries of the convex lens of the two display apparatus is connected.

Wherein the concave lens is formed on the display panel or fixed on the display panel.

Wherein the boundary of the concave lens is flush with the boundary of the display panel or over the display panel and extends to the frame zone.

Wherein the display apparatus further including a translucent cover, the translucent cover covered the display panel and the concave lens and the convex lens are formed between the translucent cover and the display panel.

Wherein the display zone including a first display zone and a second display zone, wherein the plurality of the pixels of the first display zone is arranged evenly and the arrangement of the plurality of the pixels of the second display zone is getting closer form the boundary of the first display zone and the second display zone to the frame zone; wherein the pixels in the first display zone of the display apparatus is evenly displayed in the light emitting surface faced to the first display zone; the pixels in the second display zone are diffused by the concave lens, then straight by the convex lens, and evenly displayed on the light emitting surface faced to the second display zone and the frame zone.

Wherein the display zone including one first display zone and two second display zones, the two second display zone is formed on the bilateral of the first display zone and all of the outer sides of the second display zone are the frame zone.

Wherein the concave lens is overlap with the second display zone in the normal direction vertical to the display panel.

Wherein the display apparatus further including a backlight source, the intensity of the light emitted by the backlight source to the second display zone is high than the intensity of the light emitted by the backlight source to the first display zone, and the intensity of the light emitted by the backlight source is evenly in the first display zone, and the intensity of the light emitted by the backlight source to the second display zone is higher and higher from the boundary with the first display zone to the frame zone.

The advantage of this application is, comparing to the conventional technology, a concave lens is set in the boundary of the display zone of the display apparatus and a the convex lens passing the boundary of the display zone is flush with the boundary of the frame zone to diffuse the emerge light of the boundary of the display zone by the concave lens; and straight the diffused light by the convex lens to emerge the light in the direction of vertical to the display panel to have a parallel emerging light in every part of the light emitting surface of the display apparatus. Therefore, when the display apparatus is used in the splice electrical device, the two display apparatus can achieve the seamless splicing display.

DETAILED DESCRIPTION OF THE PREFERRED EMBODIMENT

Figure 1:
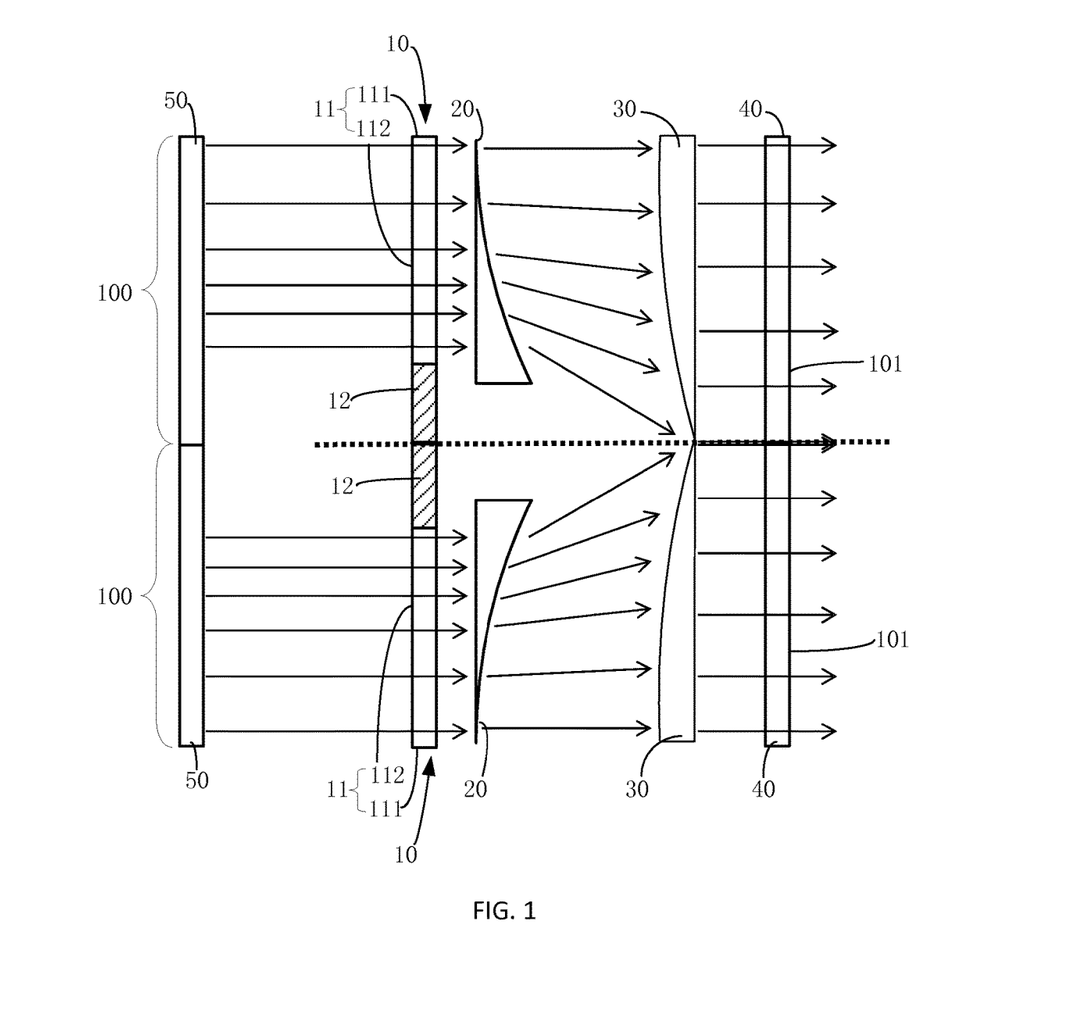
FIG. 1 is a partially exploded view of the electrical device of the embodiment according to the present invention.

Referring to FIG. 1, an electrical device is provided in this application. The electrical device includes at least two adjacent display units. Each display unit is a display apparatus 100.

In this embodiment, the display apparatus 100 is a liquid crystal display. However, the display apparatus 100 is not limited to and many kinds of the display apparatus are included. The display apparatus 100 includes a display panel 10, a concave lens 20, a convex lens 30, a translucent cover 40 and a backlight source 50.

Figure 2:
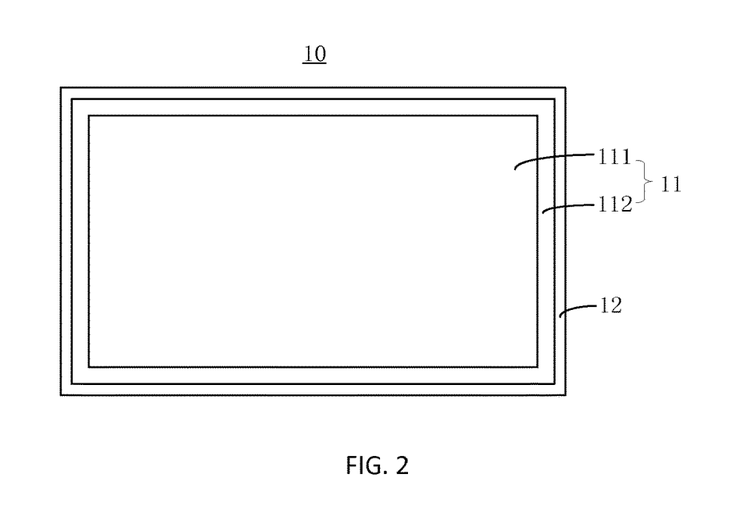
FIG. 2 is a schematic view illustrating the display panel of the display apparatus of the electrical device according to the present invention.

Referring to FIG. 2, for the liquid crystal display, a circuit, a sealant and etc. are formed on the border of the display panel 10. Therefore, the border of the liquid crystal display is a frame zone 12 that cannot display. The inner side of the frame zone 12 is a display zone 11. In other words, the frame zone 12 is set in the outer of the display zone 12. In a normal situation, the frame (not shown) is set in the frame zone 12 of the display apparatus, and fixed the display panel 10 and the backlight source (not shown) to a whole. The frame zone 12 of the display panel in the liquid crystal display is a back to the front frame. That is the frame zones 12 are set in the four sides of the rectangle display panel, and the end of the frame zones 12 are connected. The frame zone 12 of other display panel is not limited in this embodiment, for example, the frame zones are set in the two ends of the long sides of the display panel, or the frame zones are only set in the two ends of the short sides. FIG. 1 is a partially exploded view only shown the border structure of the two adjacent display panels 10 of the electrical device.

Figure 3:
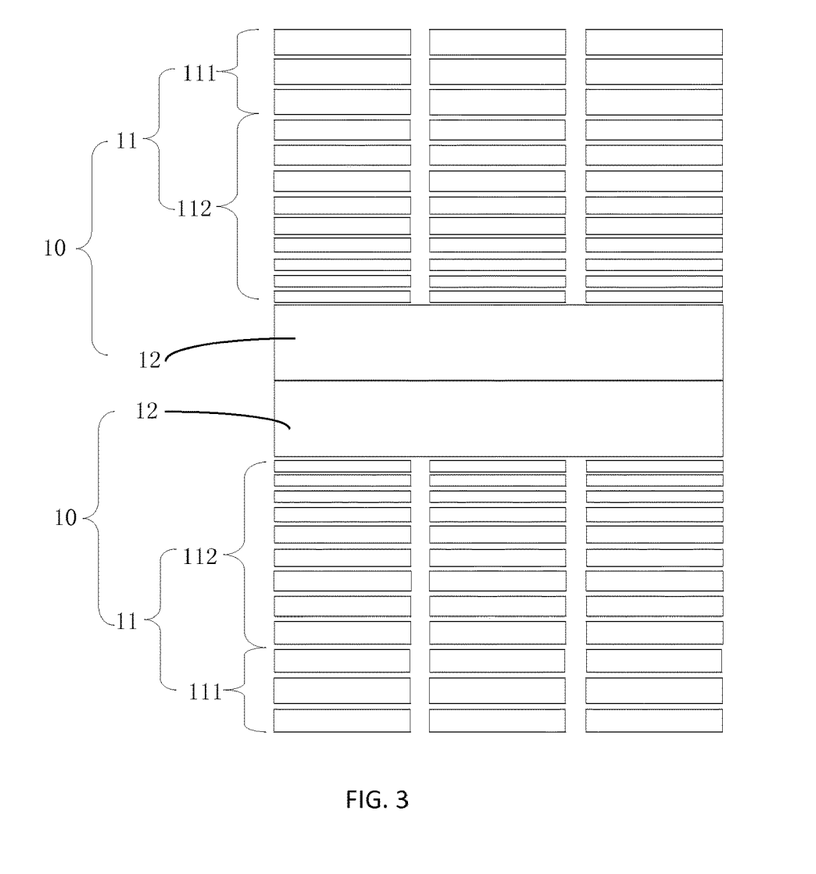
FIG. 3 is a schematic view illustrating the pixel distribution of the electrical device according to the present invention.

Referring to FIG. 3, the display zone 11 includes a first display zone 111 and a second display zone 112. A plurality of the pixels is distributed evenly, that is the shape and the area of each pixel and other pixel in the first display zone 111 is equal. The second display zone 112 is formed between the first display zone 111 and the frame zone 12. The arrangement of a plurality of the pixels in the second display zone 112 is become closer from the borderline of the first display zone 111 and the second display zone 112 to the frame zone 12. The definition of the arrangement of the plurality of the pixels in the second display zone 112 is become closer is as followed. In the direction towards the frame zone 12, the width of the each pixel of the second display zone 12 is become narrower. As for the display panel having frame zones 12 in the four sides of the liquid crystal display apparatus, since the frame zone is a back to the front shape. So the second display zone 112 set between the first display zone 111 and the frame zone 12 is also a back to the front shape. That is the second display zone 112 is set in the every sides of the rectangle first display zone 111. And the front and the end of the second display zone 112 are connected. As for the examples of the display panel having frame zones 12 in the two sides or two ends of the display apparatus, the number of the second display zone is also two and distributed in the bilateral sides or ends of the display zone, the outer of the first display zone and the inner side of the frame zone.

A concave lens 20 is formed in the boundary of the display zone 11, and faces the second display zone 112 of the display zone 11. The concave lens 20 is used to diffuse partial of the light emitted by the second display zone 112 of the display zone 11 to the frame zone 12. In this embodiment, because the function of the concave lens 20 is to diffuse partial of the light emitted by the second display zone 112 to the frame zone 12. Therefore, it can be understand that the concave lens 20 is a concave lens with cambered surface but not non-spherical. The concave lens 20 can be formed in the display panel 10, which is formed on the glass substrate (not shown) of the light extraction side of the display panel 10, or the single concave lens 20 is fixed on the display panel 10. The concave lens 20 can be flush with the outer side of the second display zone 112 of the display panel 10 or over the second display zone 112 to the frame zone 12. In a preferred embodiment, the concave lens 20 is overlap with the second display zone 112 in the normal direction vertical to the display panel 10.

A boundary side of the convex lens 30 is align to the inner side of the concave lens 20 faced to the display panel 11. The convex lens 30 extend the boundary of the second display zone 112 of the display panel 10 and the frame zone 12, and the other boundary of the convex lens 30 is flush with the boundary of the frame zone 12. In other words, the convex lens 30 is covering the concave lens 20 and the frame zone 12 in the normal direction vertical to the display panel 10. The convex lens 30 is used to emerge parallel light diffused from the concave lens 20 and make the emerging light to be a parallel light vertical to the display panel 10 in the normal direction. Corresponding with the concave lens 20, the convex lens 30 is a convex lens with a cambered surface but not non-spherical. The convex lens 30 is formed between the concave lens 20 and the translucent cover 40. The convex lens 30 can be formed in the inner side of the translucent cover 40 face the display panel 10, or fix the single convex lens 30 in the translucent cover 40.

After the translucent cover 40 covered in the display panel 10, the concave lens 20 and the convex lens 30 are formed between the display panel 10 and the translucent cover 40. The translucent cover 40 is used to fix the convex lens 30, and make the display apparatus 100 have a smooth surface. The area of the translucent cover 40 is equal to the area of the display panel 10, such as the translucent cover 40 is fully covering the display panel 10. When two of the display apparatus 100 or more than two display apparatus 100 are spliced together to an electrical device, the adjacent display panels 10 of the display apparatus 100 are spliced. The surface of the translucent cover 40 away from the display panel 10 is the light emitting surface 101 of the display apparatus 100.

The backlight source 50 is formed on the outer side of the display panel 10, which is the side away from the translucent cover 40. The backlight source 50 provides the backlight to the display panel 10.

Figure 4:
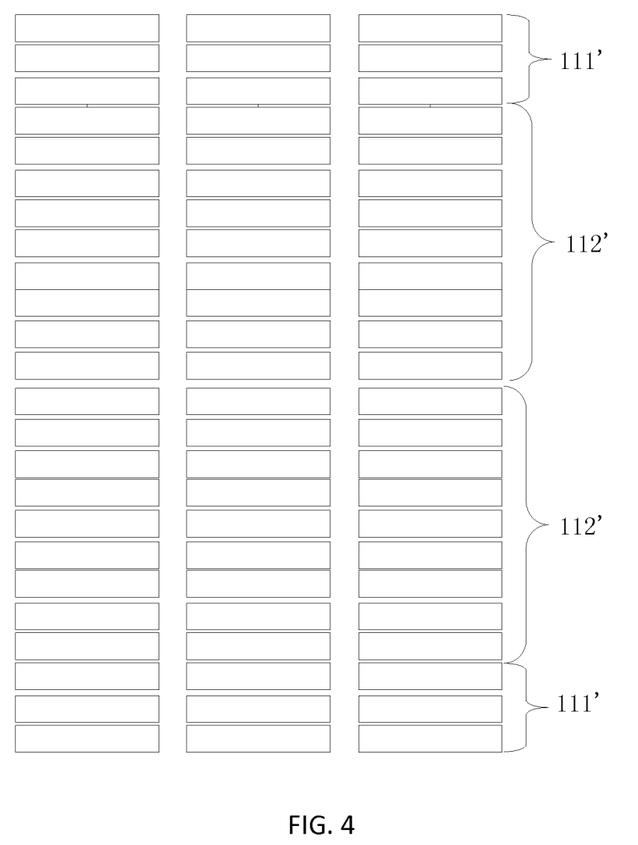
FIG. 4 is a schematic view illustrating the pixel distribution of the electrical device in the display mode according to the present invention.

Referring to FIG. 4, when the backlight source 50 and the display panel 10 are on, the light from the backlight source 50 is emitted to the display zone 11 of the display panel 10. The light pass the pixels of the first display zone 111, the translucent cover 40 and display evenly a pixel array 111' on the light emitting surface 101. The light pass the pixels of the second display zone 112 are diffused by the concave lens 20, and the light diffused by the concave lens 20 is further straight by the convex lens 30, the straight light pass through the translucent cover 40 and display evenly a pixel array 112' on the light emitting surface 101 on the zone face the second display zone 112 and the frame zone 12. Therefore the display pixel distributed evenly on the light emitting surface 101 of the display apparatus 100.

In a preferred embodiment, in order to normalize the intensity of the emerge light of the pixel array distributed evenly on the light emitting surface 101, the intensity of the light, that is emitted by the backlight source 50 and enters into the second display zone 112, is higher than the intensity of the light, that is emitted by the backlight source 50 and enters into the first display zone 111, and furthermore the intensity of the light, that is emitted by the backlight source 50 and enters into the second display zone 112, becomes higher and higher from the boundary with the first display zone 111 to the frame zone 12.

When two of the display apparatus 100 or more than two display apparatus 100 are spliced together to an electrical device, the convex lens in the adjacent boundary of the display apparatus are connected. By this, because the display pixel are formed everywhere in the light emitting surface 101 of the display apparatus 100, the seams is not shown in the splice part between the adjacent display apparatus 100. Furthermore, the pixels of the light emitting surface 101 of the display apparatus 100 distribute evenly. Therefore, a deform display will not be shown. To be more specific, the intensity of the light emitted from the backlight source 50 to the second display zone 112 is higher and higher from the boundary with the first display zone 111 to the frame zone 12. It makes the intensity of the pixel display of the light emitting surface 101 of the display apparatus is normalized, and a partially darker display zone is not shown.

Figure 5:
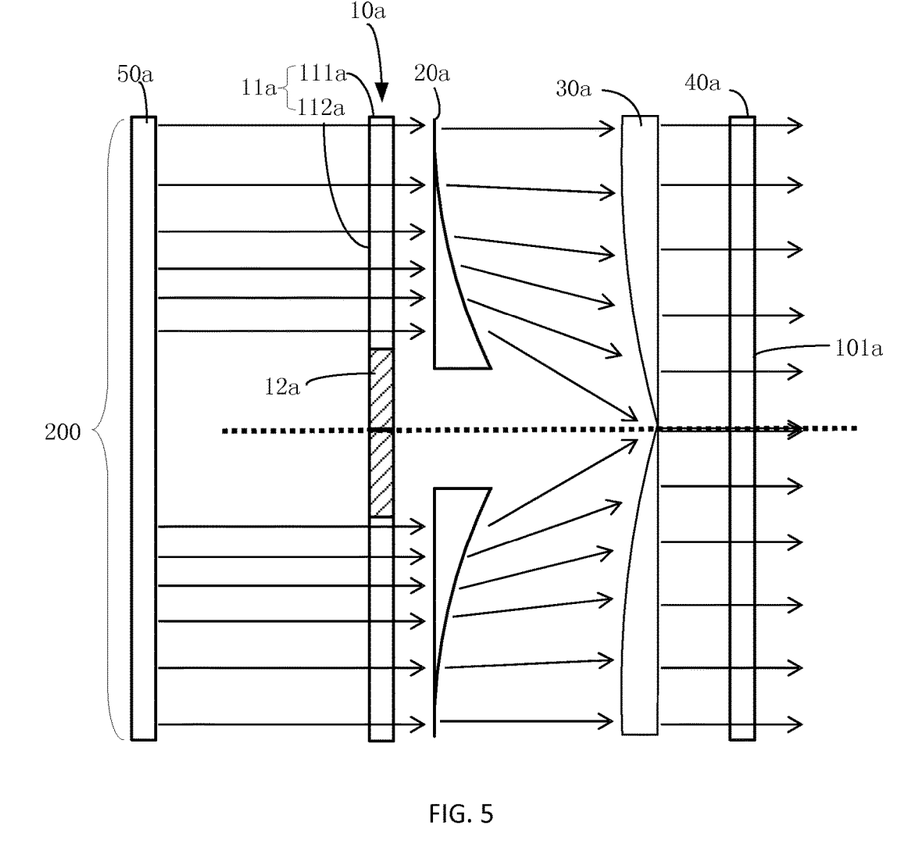
FIG. 5 is a partially exploded view of the electrical device of another embodiment according to the present invention.

Referring to FIG. 5, FIG. 5 is the display apparatus of another embodiment according to the present invention. The display apparatus 200 includes two or more than two spliced display panels 10a. Each display panel 10a includes a display zone 11a and a frame zone 12a. The display zone 11a includes a first display zone 111a, and a second display zone 112a. A concave lens 20a and a convex lens 30a are set corresponding to each of the second display zone 112a. The display apparatus 200 further includes a co-using translucent cover 40a and a backlight source 50a. The surface of the translucent cover 40a away from the display panel 10a is a light emitting surface 101a.

The detail structure and the corresponding relationship of the display panel 10a, the concave lens 20a and the convex lens 30a of the display apparatus 200 is the same with the display panel 10, the concave lens 20 and the convex lens 30 of the display apparatus mentioned above. In this embodiment, the difference between the display apparatus mentioned above is the backlight source 50a provides backlight to the different display panel 10a at the same time. The translucent cover 40a is covering the entire splice surface of the plurality of the spliced display panels 10a, the concave lens 20a and the convex lens 30a.

To distinguish from the conventional technology, the concave lens is set on the boundary of the display zone of the display panel of the display apparatus to diffuse partial of the light emerged from the display zone to the side of the frame zone. The convex lens is used to collect the light diffused from the concave lens and emerge the light parallel to have a parallel emerging light in every part of the light emitting surface of the display apparatus. When more than two of the display apparatus are splice to an electrical device, the splice seams are not shown in the display surface of the electrical device.

The foregoing description is only embodiments of the present invention, not used to limit the scope and range of the present invention. Those equivalent changes or modifications made according to the shape, structure, feature, or spirits described in the claims of the present invention are included in the appended claims of the present invention.

What is claimed is:

1. A display apparatus, the display apparatus comprising:
at least a display panel, wherein the display panel has a display zone with a plurality of arranged pixels, and a frame zone outside of the display zone;
at least a concave lens, wherein the concave lens is disposed in a boundary of the display zone to diffuse part of light emerging from the display zone to the frame zone wherein the concave lens corresponds to more than one of the arranged pixels, a protruding region of the concave lens is toward a light emitting direction and a most protruding region of the concave lens is adjacent to the boundary of the display zone;
at least a convex lens, wherein one boundary of the convex lens is flush with an inner side of the concave lens facing the display zone, the convex lens crossing the boundary of the display zone and the frame zone, and another boundary is flush with a boundary of the frame zone and emerging parallel light is diffused by the concave lens;
the light passes through the concave lens and the convex lens to have a parallel emerging light in every part of a light emitting surface of the display apparatus;
a translucent cover, wherein the translucent cover covers the display panel, and the concave lens and the convex lens are formed between the translucent cover and the display panel;
the display zone further comprises a first display zone and a second display zone, wherein the plurality of pixels of the first display zone are arranged evenly, and an arrangement of the plurality of pixels of the second display zone is gradually closer together from the boundary of the first display zone and the second display zone to the frame zone;
wherein both the concave lens and the convex lens covers the second display zone and exposes the first display zone, the pixels in the first display zone of the display apparatus do not overlap the concave lens and the convex lens and are directly evenly displayed in a first part of the light emitting surface facing the first display zone;
light from the pixels in the second display zone are diffused by the concave lens, then straightened by the convex lens, and evenly displayed on a second part of the light emitting surface facing the second display zone and the frame zone;
wherein a width of each pixel of the second display zone becomes narrower along a direction from the boundary of the first display zone and the second display zone to the frame zone; and
a backlight source, wherein an intensity of light, that is emitted by the backlight source and enters into the second display zone, is higher than an intensity of light, that is emitted by the backlight source and enters into the first display zone; the intensity of light, that is emitted by the backlight source and enters into the first display zone is evenly distributed; and the intensity of light, that is emitted by the backlight source and enters into the second display zone, becomes higher in intensity from the boundary of the first display zone and the second display zone to the frame zone.

2. The display apparatus according to claim 1, wherein a boundary of the concave lens is flush with the boundary of the display zone or overlaps the display zone and extends to the frame zone.

3. A display apparatus, the display apparatus comprising:
at least a display panel, wherein the display panel has a display zone with a plurality of arranged pixels, and a frame zone outside the display zone;
at least a concave lens, wherein the concave lens is disposed in a boundary of the display zone to diffuse part of the light emerging from the display zone to the frame zone, wherein the concave lens corresponds to more than one of the arranged pixels,
a protruding region of the concave lens is toward a light emitting direction and a most protruding region of the concave lens is adjacent to the boundary of the display zone;
at least a convex lens, wherein one boundary of the convex lens is flush with an inner side of the concave lens facing the display zone, the convex lens crossing the boundary of the display zone and the frame zone, and another boundary is flush with a boundary of the frame zone and emerging parallel light is diffused by the concave lens;
wherein the display zone further comprises a first display zone and a second display zone around the first display zone, both the concave lens and the convex lens cover the second display zone and expose the first display zone,
light from the first display zone does not pass through the concave lens and the convex lens and directly forms a first parallel emerging light in a first part of the light emitting surface facing the first display zone, and
light from the second display zone passes through the concave lens and the convex lens to form a second parallel emerging light in a second part of the light emitting surface of the display apparatus facing the second display zone and the frame zone; and
a backlight source, wherein an intensity of light, that is emitted by the backlight source and enters into the second display zone, is higher than an intensity of light, that is emitted by the backlight source and enters into the first display zone; the intensity of light, that is emitted by the backlight source and enters into the first display zone is evenly distributed; and the intensity of the light, that is emitted by the backlight source and enters into the second display zone, becomes higher in intensity from the boundary of the first display zone and the second display zone to the frame zone.

4. The display apparatus according to claim 3, wherein the concave lens is formed on the display panel or fixed on the display panel.

5. The display apparatus according to claim 3, wherein a boundary of the concave lens is flush with a boundary of the display panel or overlaps with the display panel and extends to the frame zone.

6. The display apparatus according to claim 3, wherein the display apparatus further comprises a translucent cover, the translucent cover covers the display panel, and the concave lens and the convex lens are formed between the translucent cover and the display panel.

7. The display apparatus according to claim 6, wherein the convex lens is formed on the translucent cover or fixed on the translucent cover.

8. The display apparatus according to claim 3, wherein the display zone comprises a first display zone and a second display zone, wherein the plurality of pixels of the first display zone are arranged evenly and an arrangement of the plurality of pixels of the second display zone is gradually closer together from the boundary of the first display zone and the second display zone to the frame zone; wherein the pixels in the first display zone of the display apparatus are evenly displayed in the light emitting surface facing the first display zone; the pixels in the second display zone are diffused by the concave lens, then straightened by the convex lens, and evenly displayed on the light emitting surface facing the second display zone and the frame zone.

9. The display apparatus according to claim 8, wherein the display zone comprises one first display zone and two second display zones, the two second display zones are formed bilaterally on the first display zone and all outer sides of the second display zones are the frame zone.

10. The display apparatus according to claim 8, wherein the concave lens is overlapped with the second display zone in the normal direction vertical to the display panel.

11. An electrical device, wherein the electrical device comprises two display zones, both of the two display zones are display apparatuses, the display apparatuses comprising:
at least a display panel, wherein the display panel has a display zone with a plurality of arranged pixels, and a frame zone in the outer of the display zone;
at least a concave lens, wherein the concave lens is set in a boundary of the display zone to diffuse part of light emerging from the display zone to the frame zone, wherein the concave lens corresponds to more than one of the arranged pixels, a protruding region of the concave lens is toward a light emitting direction and a most protruding region of the concave lens is adjacent to the boundary of the display zone;
at least a convex lens, wherein one boundary of the convex lens is flush with an inner side of the concave lens facing the display zone, the convex lens crossing the boundary of the display zone and the frame zone, and another boundary is flush with a boundary of the frame zone and emerging parallel light is diffused by the concave lens;
wherein the display zone further comprises a first display zone and a second display zone around the first display zone, both the concave lens and the convex lens cover the second display zone and expose the first display zone, light from the first display zone does not pass through the concave lens and the convex lens and directly forms a first parallel emerging light in a first part of the light emitting surface facing the first display zone, and light from the second display zone passes through the concave lens and the convex lens to form a second parallel emerging light in a second part of the light emitting surface of the display apparatus facing the second display zone and the frame zone, and the boundaries of the convex lens of the two display apparatuses is connected; and
a backlight source, wherein an intensity of light, that is emitted by the backlight source and enters into the second display zone, is higher than an intensity of light, that is emitted by the backlight source and enters into the first display zone, the intensity of light, that is emitted by the backlight source and enters into the first display zone is evenly distributed, and the intensity of light, that is emitted by the backlight source and enters into the second display zone, becomes higher in intensity from the boundary of the first display zone and the second display zone to the frame zone.

12. The electrical device according to claim 11, wherein the concave lens is formed on the display panel or fixed on the display panel.

13. The electrical device according to claim 11, wherein a boundary of the concave lens is flush with the boundary of the display panel or overlaps the display panel and extends to the frame zone.

14. The electrical device according to claim 11, wherein the display apparatuses further comprise a translucent cover, the translucent cover covers the display panel, and the concave lens and the convex lens are formed between the translucent cover and the display panel.

15. The electrical device according to claim 11, wherein the display zone comprises a first display zone and a second display zone, wherein the plurality of pixels of the first display zone is arranged evenly and an arrangement of the plurality of pixels of the second display zone is gradually closer together from the boundary of the first display zone and the second display zone to the frame zone; wherein the pixels in the first display zone of the display apparatuses are evenly displayed in the light emitting surface facing the first display zone; the pixels in the second display zone are diffused by the concave lens, then straightened by the convex lens, and evenly displayed on the light emitting surface facing the second display zone and the frame, zone.

16. The electrical device according to claim 15, wherein the display zone comprises one first display zone and two second display zones, the two second display zones are formed bilaterally on the first display zone and all outer sides of the second display zones are the frame zone.

17. The electrical device according to claim 15, wherein the concave lens overlaps the second display zone in the normal direction vertical to the display panel.

* * * * *